United States Patent
Shinohara et al.

(10) Patent No.: US 10,620,370 B2
(45) Date of Patent: Apr. 14, 2020

(54) OPTICAL MULTIPLEXER

(71) Applicant: Mitsubishi Electric Corporation, Chiyoda-ku (JP)

(72) Inventors: Kosuke Shinohara, Tokyo (JP); Koichi Akiyama, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 16/331,376

(22) PCT Filed: Aug. 1, 2017

(86) PCT No.: PCT/JP2017/027813
§ 371 (c)(1),
(2) Date: Mar. 7, 2019

(87) PCT Pub. No.: WO2018/078992
PCT Pub. Date: May 3, 2018

(65) Prior Publication Data
US 2019/0258003 A1    Aug. 22, 2019

(30) Foreign Application Priority Data
Oct. 27, 2016 (JP) ................... 2016-210194

(51) Int. Cl.
*G02B 6/12* (2006.01)
*G02B 6/122* (2006.01)
(Continued)

(52) U.S. Cl.
CPC ........... *G02B 6/12007* (2013.01); *G02B 6/12* (2013.01); *G02B 6/122* (2013.01); *G02B 6/125* (2013.01);
(Continued)

(58) Field of Classification Search
CPC .................................................. G02B 6/29344
See application file for complete search history.

(56) References Cited

U.S. PATENT DOCUMENTS 5,689,597 A  *  11/1997  Besse ................... G02B 6/2813
385/39
2008/0002926 A1   1/2008  Kondou et al.
(Continued)

FOREIGN PATENT DOCUMENTS

JP    2001-166160 A    6/2001
JP    2006-301612 A    11/2006
(Continued)

OTHER PUBLICATIONS

International Search Report dated Oct. 31, 2017 in PCT/JP2017/027813 filed Aug. 1, 2017.

*Primary Examiner* — Omar R Rojas
(74) *Attorney, Agent, or Firm* — Oblon, McClelland, Maier & Neustadt, L.L.P.

(57) ABSTRACT

Two input waveguides are made of a semiconductor material. One output waveguide is made of a semiconductor material. A multi-mode-interference part is made of a semiconductor material. The multi-mode-interference part has an incoming end surface connected to the input waveguides, and an outgoing end surface opposite to the incoming end surface and connected to the output waveguide. The multi-mode-interference part has a waveguide width wider than the waveguide widths of the input waveguides and the waveguide width of the output waveguide. Two unwanted-light waveguides are made of a semiconductor material. The unwanted-light waveguides are connected to the outgoing end surface of the multi-mode-interference part so as to sandwich the output waveguide. The unwanted-light waveguides each satisfy a single-mode condition.

9 Claims, 10 Drawing Sheets

(51) Int. Cl.
 *G02B 6/125* (2006.01)
 *G02B 6/136* (2006.01)
 *G02B 6/293* (2006.01)

(52) U.S. Cl.
 CPC ........... *G02B 6/1228* (2013.01); *G02B 6/136* (2013.01); *G02B 6/2938* (2013.01); *G02B 6/29344* (2013.01); *G02B 2006/12126* (2013.01)

(56) References Cited

U.S. PATENT DOCUMENTS

| | | |
|---|---|---|
| 2012/0027337 A1 | 2/2012 | Kondou et al. |
| 2013/0064492 A1 | 3/2013 | Ishikawa et al. |
| 2016/0011370 A1* | 1/2016 | Okayama ............... G02B 6/125 385/14 |
| 2018/0039025 A1* | 2/2018 | Kojima .............. G02B 6/12016 |

FOREIGN PATENT DOCUMENTS

| | | |
|---|---|---|
| JP | 2010-237376 A | 10/2010 |
| JP | 2010-266628 A | 11/2010 |
| JP | 2011-43665 A | 3/2011 |
| JP | 2011-186258 A | 9/2011 |
| JP | 2015-35480 A | 2/2015 |
| JP | 2015-141218 A | 8/2015 |

* cited by examiner

OPTICAL MULTIPLEXER

TECHNICAL FIELD

The present invention relates to optical multiplexers, and particularly, to a multimode-interference optical multiplexer.

BACKGROUND ART

Multimode-interference optical multiplexers are used as optical multiplexers in optical integrated circuits. Loss reduction and reflection reduction in the optical multiplexers are required along with the proceeding of integration of a plurality of light sources.

For instance, Japanese Patent Application Laid-Open No. 2010-237376 (Patent Document 1) discloses an optical modulator that includes a Mach-Zehnder waveguide disposed on a dielectric substrate. An example of the dielectric is lithium niobate. The Mach-Zehnder waveguide includes an output Y-multiplexer having a multimode waveguide through which light that has been multiplexed passes. A subsidiary output waveguide is connected to a location where the multimode waveguide is changed into a main output waveguide. The subsidiary output waveguide is a waveguide for higher-order mode where radiation-mode light is output.

PRIOR ART DOCUMENT

Patent Document

Patent Document 1: Japanese Patent Application Laid-Open No. 2010-237376

SUMMARY

Problem to be Solved by the Invention

The waveguides in the technique described in the above document are made of, for instance lithium niobate, which is a ferroelectric material. A semiconductor waveguide having a similar function has a design size that is one-tenth or less of that of the lithium niobate waveguide. Hence, the interval between the main output waveguide and the subsidiary output waveguide, which is a waveguide for higher-order mode, is narrowed. This leads to difficulty in fine processing through etching for forming these waveguides. The shapes of these waveguides consequently tend to deviate from design, thereby possibly increasing undesirable light reflection.

To solve this problem, it is an object of the present invention to provide an optical multiplexer that reduces light reflection.

Means to Solve the Problem

An optical multiplexer in the present invention includes two input waveguides, one output waveguide, a multi-mode-interference part, and two unwanted-light waveguides. The input waveguides are made of a semiconductor material. The output waveguide is made of a semiconductor material. The multi-mode-interference part is made of a semiconductor material. The multi-mode-interference part has an incoming end surface connected to the input waveguides, and an outgoing end surface opposite to the incoming end surface and connected to the output waveguide. The multi-mode-interference part has a waveguide width wider than the waveguide widths of the input waveguides and the waveguide width of the output waveguide. The unwanted-light waveguides are made of a semiconductor material. The unwanted-light waveguides are connected to the outgoing end surface of the multi-mode-interference part so as to sandwich the output waveguide. The unwanted-light waveguides each satisfy a single-mode condition.

Effects of the Invention

According to the present invention, the unwanted-light waveguides satisfy the single-mode condition. This reduces the waveguide widths of the unwanted-light waveguides when compared to an instance where the unwanted-light waveguides does not satisfy the single-mode condition. Accordingly, the interval between each unwanted-light waveguide and the output waveguide increases. Such an increased interval facilitates fine processing through etching for forming these waveguides. This enables shaping of the waveguides in conformity with design with accuracy, thereby preventing increase in light reflection resulting from processing error. That is, the light reflection reduces. The waveform of light consequently improves.

These and other objects, features, aspects and advantages of the present invention will become more apparent from the following detailed description of the present invention when taken in conjunction with the accompanying drawings.

DESCRIPTION OF EMBODIMENT(S)

Embodiments of the present invention will be described with reference to the drawings. Identical or corresponding components are denoted by the same reference numerals, and will not be elaborated upon.

First Embodiment

Figure 1:
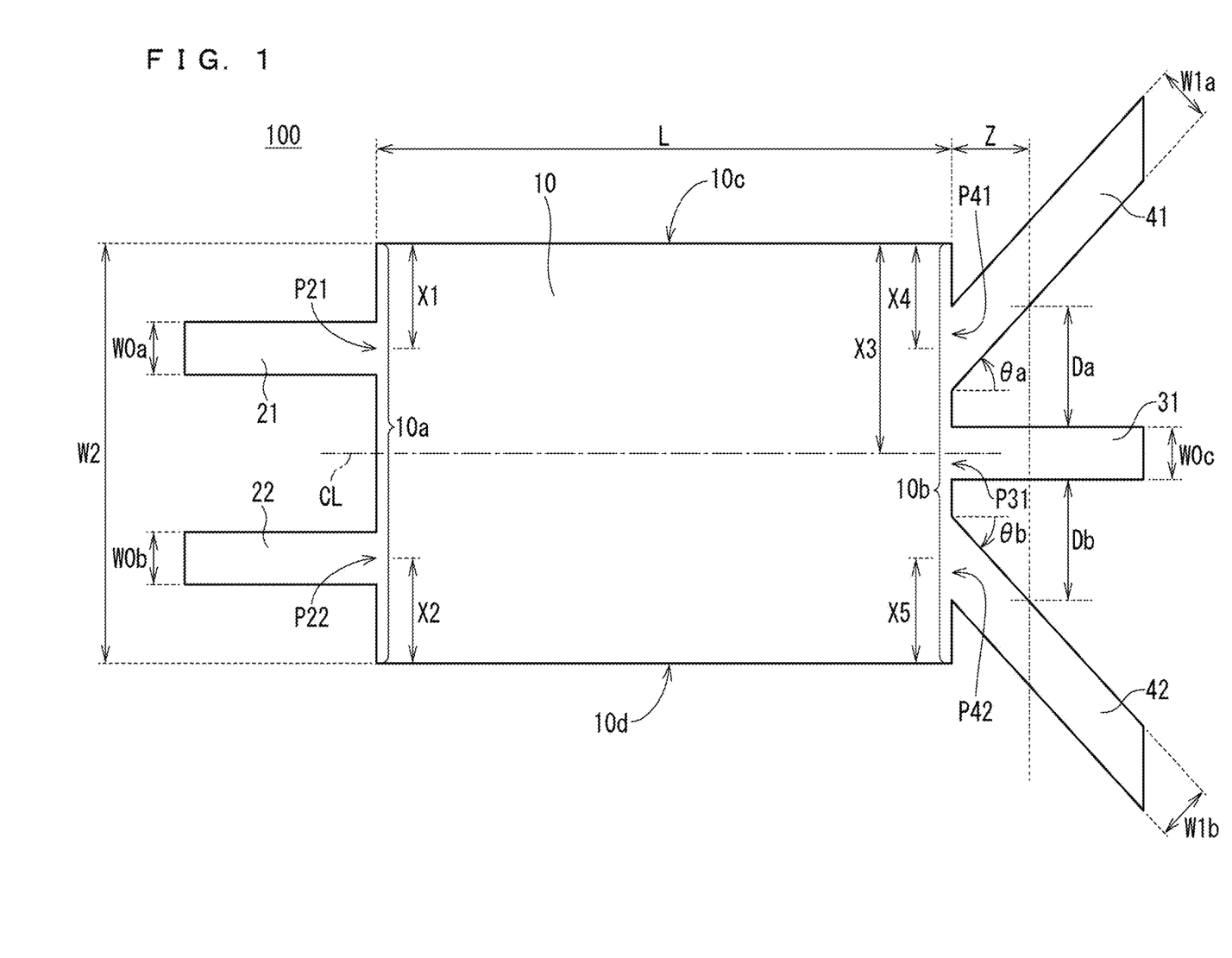
FIG. 1 is a schematic plan view of the configuration of an optical multiplexer according to a first embodiment of the present invention.
Figure 2:
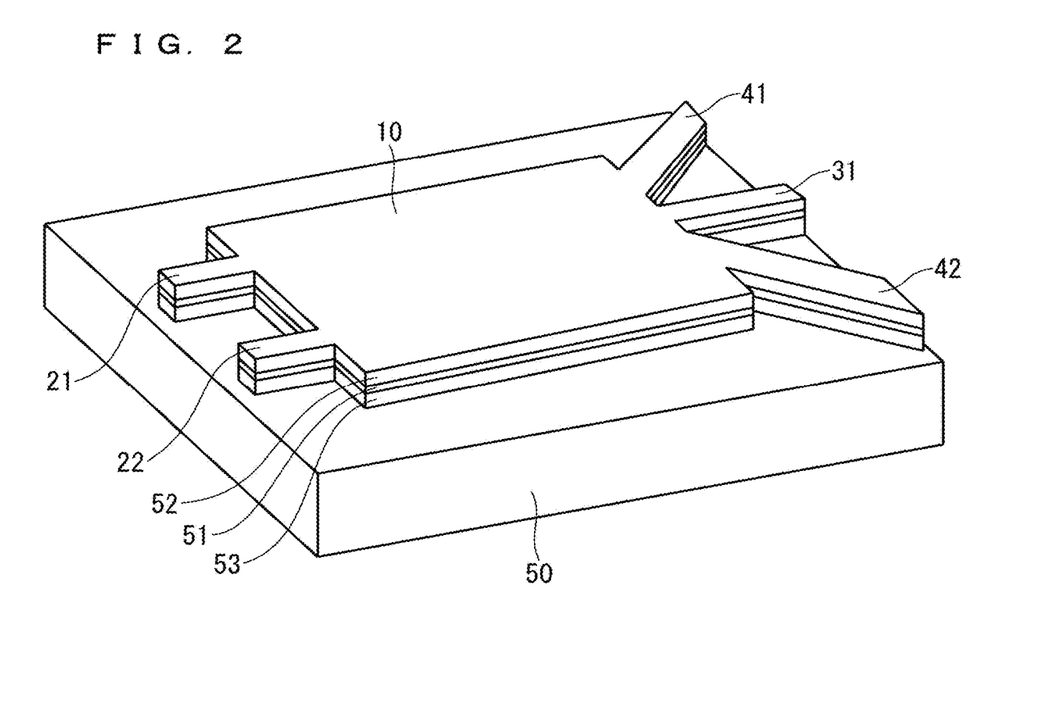
FIG. 2 is a schematic perspective view of the configuration of the optical multiplexer according to the first embodiment of the present invention.

FIG. 1 is a schematic plan view of the configuration of an optical multiplexer 100 according to a first embodiment of the present invention. FIG. 2 is a perspective view of the same. The optical multiplexer 100 includes a substrate 50, a core layer 51, and cladding layers 52 and 53. The core layer 51 is disposed between the cladding layers 52 and 53 in its thickness direction. The core layer 51 and the cladding layer 52 and 53 constitute a stack, and this stack is disposed on the substrate 50. The optical multiplexer 100 is a multi-mode-interference (MMI) optical multiplexer. Specifically, the optical multiplexer 100 includes two input waveguides 21 and 22, an output waveguide 31, a multi-mode-interference part 10, and two unwanted-light waveguides 41 and 42, each of which is formed of the aforementioned stack.

The input waveguides 21 and 22 are made of a semiconductor material. The output waveguide 31 is made of a semiconductor material. The multi-mode-interference part 10 is made of a semiconductor material. The unwanted-light waveguides 41 and 42 are made of a semiconductor material. These semiconductor materials may be the same. A semiconductor optical multiplexer is smaller than an optical multiplexer of lithium niobate (LN), which is a dielectric material, by one-tenth or less. Examples of these semiconductor materials include indium-phosphide (InP), indium-gallium-arsenide-phosphide (InGaAsP), aluminum-gallium-indium-arsenide (AlGaInAs), and indium-gallium-arsenide (InGaAs).

The multi-mode-interference part 10 has an incoming end surface 10a and an outgoing end surface 10b opposite the incoming end surface 10a. The incoming end surface 10a is a surface through which light is incident on the multi-mode-interference part 10. The incident light may be any of single-mode light and multi-mode light. The outgoing end surface 10b is a surface through which the light from the multi-mode-interference part 10 is emitted. The emitted light may be any of single-mode light and multi-mode light. The multi-mode-interference part 10 also has an end surface 10c and an end surface 10d opposite the end surface 10c. A straight line passing through the center of an incoming end surface and the center of an outgoing end surface in plan view is defined as a center line CL. In the plan view of FIG. 1, the straight line passing through the center of the incoming end surface 10a and the center of the outgoing end surface 10b is a center line CL. The incoming end surface 10a, the outgoing end surface 10b, the end surface 10c, and the end surface 10d form a substantially rectangular shape in FIG. 1. In other words, the multi-mode-interference part 10 is substantially rectangular in plan view. The size of the incoming end surface 10a (the size in the vertical direction in FIG. 1) is substantially the same as the size of the outgoing end surface 10b (the size in the vertical direction in FIG. 1).

The input waveguides 21 and 22 are connected to the incoming end surface 10a. In other words, the incoming end surface 10a is provided with input ports P21 and P22 respectively connected to the input waveguides. 21 and 22. The input ports P21 and P22 are preferably disposed on the incoming end surface 10a so as to be almost symmetrical with respect to the center line CL.

The multi-mode-interference part 10 has a waveguide width W2 that is wider than the waveguide width W0a of the input waveguide 21, the waveguide width W0b of the input waveguide 22, and the waveguide width W0c of the output waveguide 31. The waveguide width W2 corresponds to the aforementioned size of the incoming end surface 10a.

The multi-mode-interference part 10 is formed in such a manner that convergent light can be obtained at one location on the outgoing end surface 10b. The output waveguides 31 is connected to the outgoing end surface 10b. In other words, the outgoing end surface 10b is provided with an output port P31 connected to the output waveguide 31. The output port P31 is a port for outputting (taking out) the aforementioned convergent light from the multi-mode-interference part 10. The output port P31 is preferably disposed in the middle of the outgoing end surface 10b. In other words, a distance X3 is about half the waveguide width W2 in FIG. 1. Here, the distance X3 is the distance from the upper end of the incoming end surface 10a in FIG. 1 (i.e., from the end surface 10c) to the center in the width direction of the output port P31 (the vertical direction in FIG. 1).

The input ports P21 and P22 are disposed in such a manner that the convergent light is positioned in the vicinity of the middle of the outgoing end surface 10b. Specifically, the input port P21 is disposed to be away from the upper end of the incoming end surface 10a in FIG. 1 (i.e., from the end surface 10e) by about a quarter of the size of the incoming end surface 10a (the size in the vertical direction in FIG. 1). Moreover, the input port P22 is disposed to be away from the upper end of the incoming end surface 10a in FIG. 1 by about three-quarters of the size of the incoming end surface 10a. In other words, the input port P21 is disposed to be away from the lower end of the incoming end surface 10a in FIG. 1 (i.e., from the end surface 10d) by about three-quarters of the size of the incoming end surface 10a. Moreover, the input port P22 is disposed to be away from the lower end of the incoming end surface 10a in FIG. 1 by about a quarter of the size of the incoming end surface 10a.

In other words, distances X1 and X2 are each about a quarter of the waveguide width W2. Here, the distance X1 is the distance from the upper end of the incoming end surface 10a in FIG. 1 (i.e., from the end surface 10c) to the center in the width direction of the input port P21 (the vertical direction in FIG. 1). Moreover, the distance X2 is the distance from the lower end of the incoming end surface 10a in FIG. 1 (i.e., from the end surface 10d) to the center in the width direction of the input port P22 (the vertical direction in FIG. 1).

The unwanted-light waveguides 41 and 42 are connected to the outgoing end surface 10b of the multi-mode-interference part 10. In other words, the outgoing end surface 10b is provided with unwanted-light ports P41 and P42 respectively connected to the unwanted-light waveguides 41 and 42. The unwanted-light waveguides 41 and 42 are connected to the outgoing end surface 10b so as to sandwich the output waveguide 31. In other words, the respective unwanted-light waveguides 41 and 42 are connected onto the outgoing end surface 10b on one and the other sides of the output waveguide 31. In other words, the output waveguide 31 is connected to the outgoing end surface 10b, between the unwanted-light waveguides 41 and 42. The unwanted-light ports P41 and P42 are preferably disposed on the outgoing end surface 10b so as to be almost symmetrical with respect to the center line CL.

The unwanted-light waveguides 41 and 42 respectively have waveguide widths W1a and W1b narrower than the waveguide width W2 of the multi-mode-interference part 10. The unwanted-light waveguides 41 and 42 each satisfy a single-mode condition. Thus, light entering the unwanted-light waveguides 41 and 42 propagates through the unwanted-light waveguides 41 and 42 not in higher-order mode, but in fundamental mode. The unwanted-light waveguides 41 and 42 preferably, respectively extend at angles θa and θb greater than 0 degrees and smaller than 85 degrees with respect to the output waveguide 31. In the following description, the angles θa and θb as a whole can be referred to as an angle θ.

An example of the single-mode condition will be described. Consider a slab waveguide that includes the core layer 51 having a refractive index of $n_1$, the cladding layer 52 having a refractive index of $n_2$, and the cladding layer 53 having a refractive index of $n_3$. Let the thickness of the core layer 51 be denoted by d; moreover, the wavelength of light in a vacuum, by $\lambda_0$. Further, let the following equations be defined:

$$a(n_3^2 - n_1^2)/(n_2^2 - n_3^2); \text{ and}$$

$$V = (2\pi/\lambda_0) \cdot d \cdot (n_2^2 - n_3^2)^{1/2}.$$

In this case, the aforementioned waveguide satisfies the single-mode condition when the following expression is satisfied:

$$V < (\pi/2) + (1/2) \cdot \arctan(a^{1/2}).$$

Light propagates through a waveguide satisfying the single mode in the fundamental mode.

The unwanted-light waveguides 41 and 42 prevent light reflection in a portion of the outgoing end surface 10b where the output port P31 is not disposed. In other words, the unwanted-light waveguide 41 or 42 takes out light that would reflect without the unwanted-light waveguides 41 and 42, to the outside of the multi-mode-interference part 10 via the unwanted-light port P41 or P42.

Figure 3:
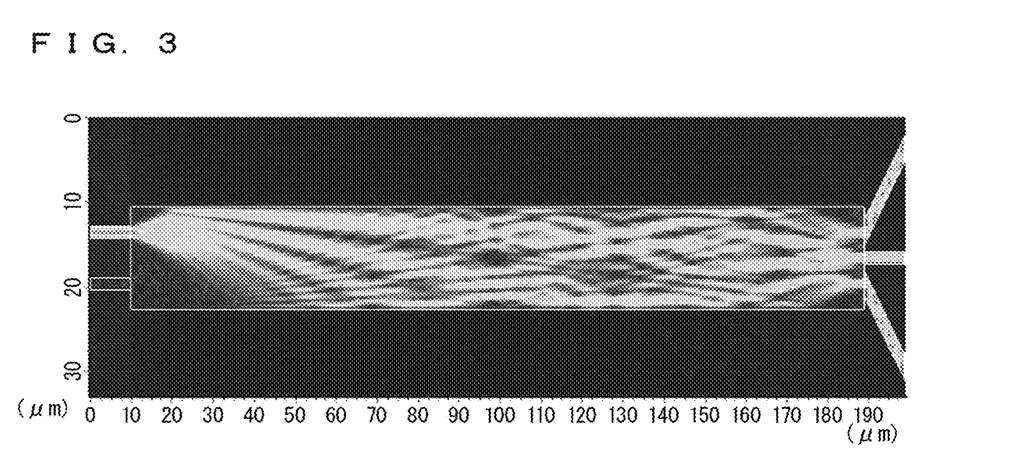
FIG. 3 is a plan view of an example of the calculation result of the light intensity distribution of transmitted light in the optical multiplexer according to the first embodiment of the present invention.

FIG. 3 is a plan view of an example of the calculation result of the light intensity distribution of transmitted light when a beam of transverse-electric-field (TE) polarized light having a wavelength of 1.295 μm enters from the input port P21 of the optical multiplexer 100 (FIG. 1). The "transmitted light" in this calculation is light passing from the input port P21 toward the output port P31 in the optical multiplexer 100. In the drawing, a brighter site indicates a higher light intensity. Furthermore, the white lines denote the outline of the optical multiplexer 100, and the rectangular portion corresponds to the multi-mode-interference part 10. Here, "calculation" means calculation using a computer or other things, and will be similarly defined in the following description.

According to the calculation result (FIG. 3), unwanted light has a high intensity in positions of the outgoing end surface 10b, corresponding to the input ports P21 and P22 of the incoming end surface 10a. In other words, the unwanted light has a high intensity in positions away from the upper end of the outgoing end surface 10b in FIG. 3 (i.e., from the end surface 10c in FIG. 1), by about a quarter and three-quarters of the size of the incoming end surface 10a (the size in the vertical direction in FIG. 3). This result reveals that the unwanted-light port P41 is preferably disposed to be away from the upper end of the outgoing end surface 10b in FIG. 3 (i.e., from the end surface 10c in FIG. 1) by about a quarter of the size of the outgoing end surface 10b (the size in the vertical direction in FIG. 1), and that the unwanted-light port P42 is preferably disposed to be away from the upper end of the outgoing end surface 10b in FIG. 3 by about three-quarters of the size of the outgoing end surface 10b. In other words, the unwanted-light port P41 is preferably disposed to be away from the lower end of the outgoing end surface 10b in FIG. 1 (i.e., from the end surface 10d in FIG. 1) by about three-quarters of the size of the outgoing end surface 10b; moreover, the unwanted-light port P42 is preferably disposed to be away from the lower end of the outgoing end surface 10b in FIG. 3 by about a quarter of the outgoing end surface 10b. In other words, in FIG. 1, distances X4 and X5 are each preferably about a quarter of the waveguide width W2. Here, the distance X4 is the distance from the upper end of the outgoing end surface 10b in FIG. 1 (i.e., from the end surface 10c in FIG. 1) to the center in the width direction of the unwanted-light port P41 (the vertical direction in FIG. 1). Moreover, the distance X5 is the distance from the lower end of the outgoing end surface 10b in FIG. 1 (i.e., from the end surface 10d in FIG. 1) to the center in the width direction of the unwanted-light port P42 (the vertical direction in FIG. 1).

The following details a size condition used in the aforementioned calculation. The waveguide width W0a of the input waveguide 21, the waveguide width W0b of the input waveguide 22, and the waveguide width W0c of the output waveguide 31 are 1.4 μm. The waveguide width W1a of the unwanted-light waveguide 41 and the waveguide width W1b of the unwanted-light waveguide 42 are 2.1 μm. The waveguide width W2 of the multi-mode-interference part 10 is 12.0 μm. The distances X1 and X2 are each 10 μm. The distance X3 is 6.0 μm. The distances X4 and X5 are each 3.0 μm. The length L of each of the end surfaces 10c and 10d is 179 μm.

The angle θa between the unwanted-light waveguide 41 and the output waveguide 31 and the angle θb between the unwanted-light waveguide 42 and the output waveguide 31, are greater than 0 degrees and smaller than 85 degrees, and are angles at which etching can be performed with sufficient accuracy in the production of the optical multiplexer 100. Here, the angle θ has a positive symbol when, as indicated by the arrows in FIG. 1, the interval between the output waveguide 31 and each of the unwanted-light waveguides 41, 42 increases along with distance from the outgoing end surface 10b. In the aforementioned calculation, the angles θa and θb are equal.

In the aforementioned calculation, the input ports P21 and P22 are disposed on the incoming end surface 10a so as to be almost symmetrical with respect to the center line CL. Further, the output port P31 is disposed on the outgoing end surface 10b so as to be located on the center line CL. The unwanted-light ports P41 and P42 are disposed on the outgoing end surface 10b so as to be almost symmetrical with respect to the center line CL. For a size equivalent to the aforementioned specific size, a margin of error about 0.2 μm is considered to not have a great adverse effect on the positions of the individual ports. Such a margin of error is considered to be allowable in the other embodiments.

Figure 4:
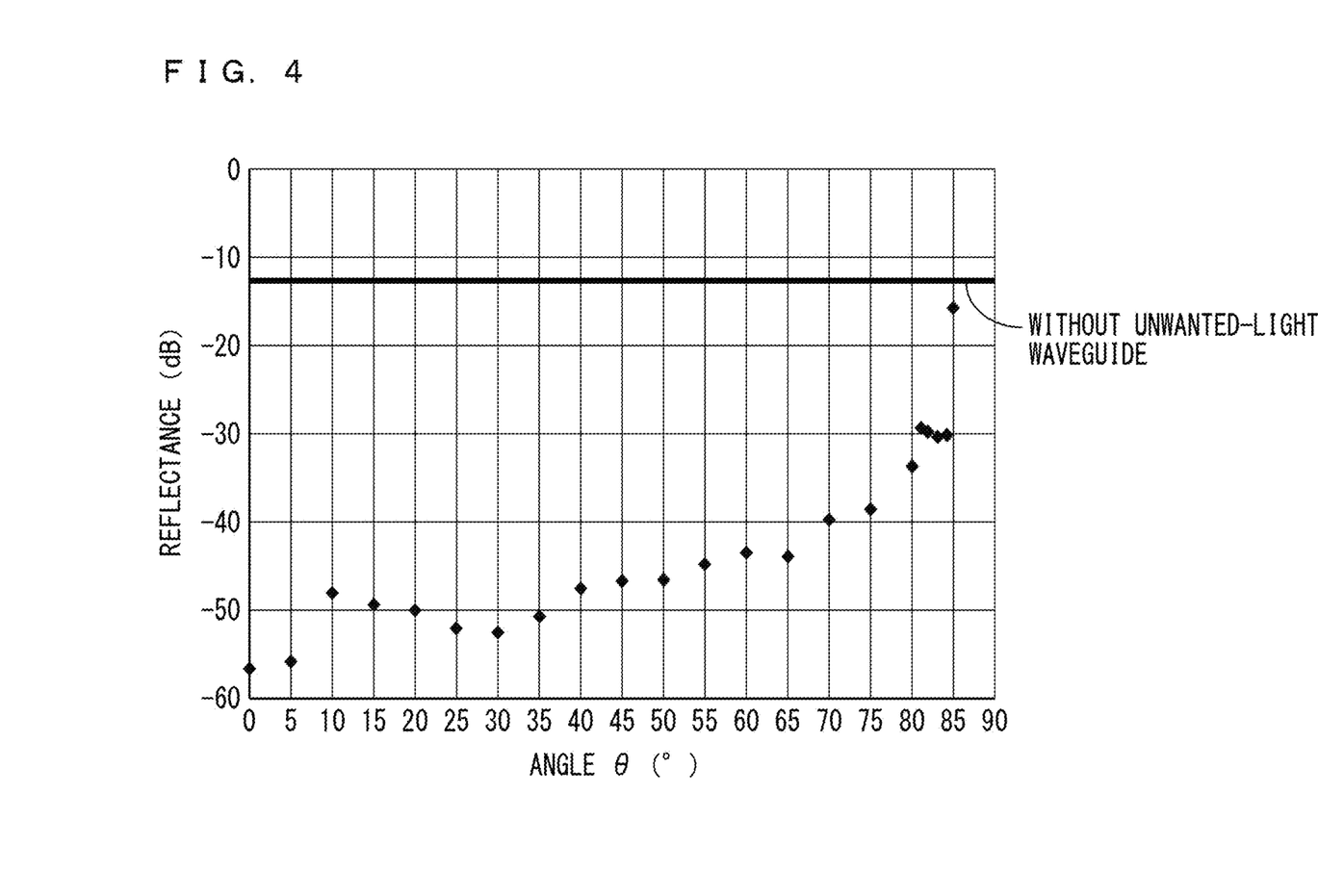
FIG. 4 is a graph showing an example of the calculation result of the relationship between reflectance and the angle between an output waveguide and an unwanted-light waveguide.
Figure 5:
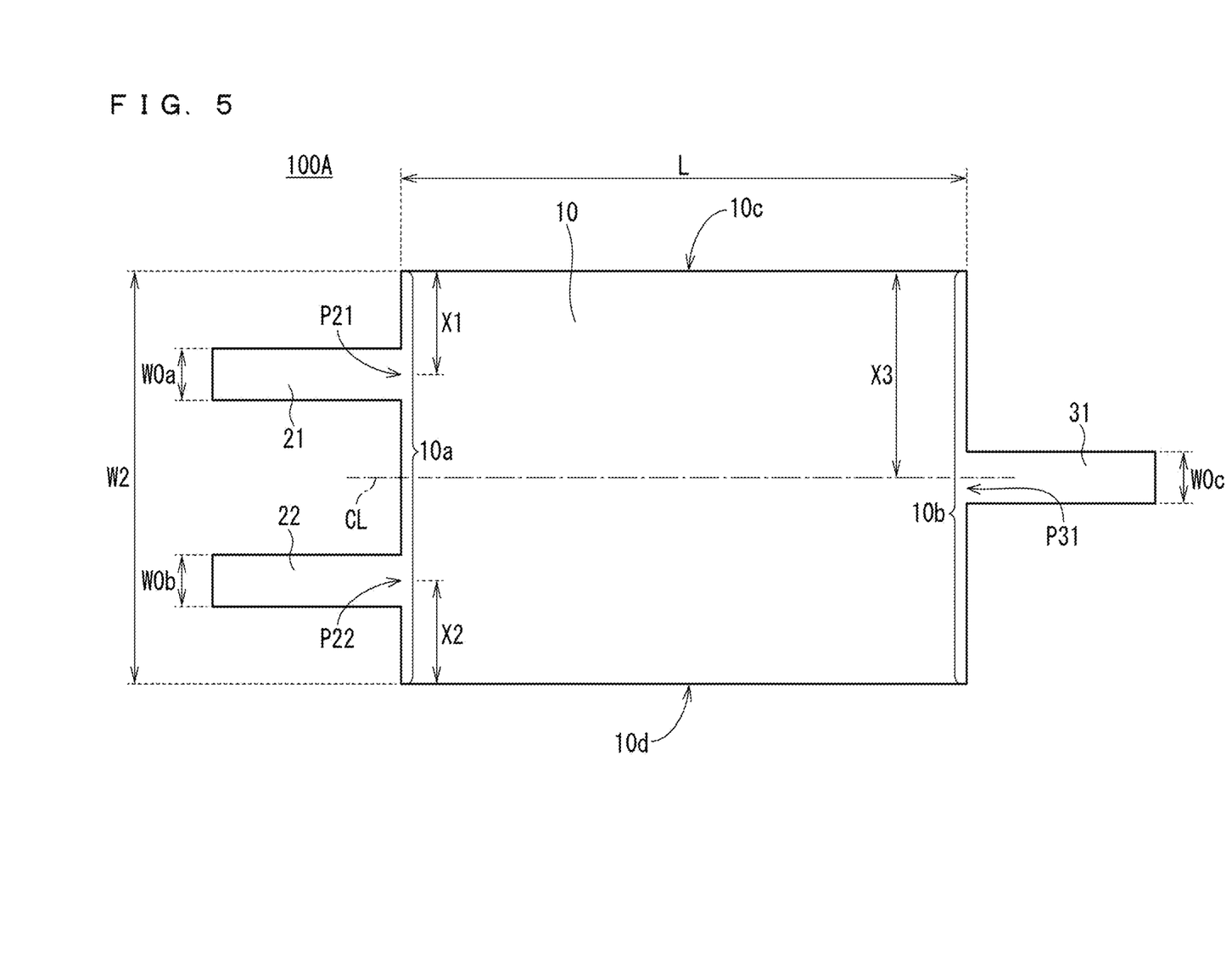
FIG. 5 is a plan view of the configuration of an optical multiplexer in a comparative example.

FIG. 4 is a graph showing an example of the calculation result of the relationship between reflectance, and the angle θ (the angles θa and θb in FIG. 1) in a range of 0 degrees≤θ≤85 degrees. Here, the reflectance is the ratio of the intensity of reflection light (reflected return light) that reflects on the output end surface 10b and then joins to the input waveguide 21, to the intensity of incident light. FIG. 5 is a plan view of the configuration of an optical multiplexer 100A without the unwanted-light waveguides 41 and 42, in a comparative example. As indicated by the solid line in FIG. 4, the reflectance of the optical multiplexer 100A in the comparative example is calculated to be −12.71 dB. Meanwhile, as indicated by the plot dots in FIG. 4, the graph reveals that the reflectance of the optical multiplexer 100 in the present embodiment, which includes the unwanted-light waveguides 41 and 42, is noticeably lower than the reflectance of the optical multiplexer optical 100A, i.e., −12.71 dB, particularly when the angle θ is smaller than 85 degrees.

Figure 6:
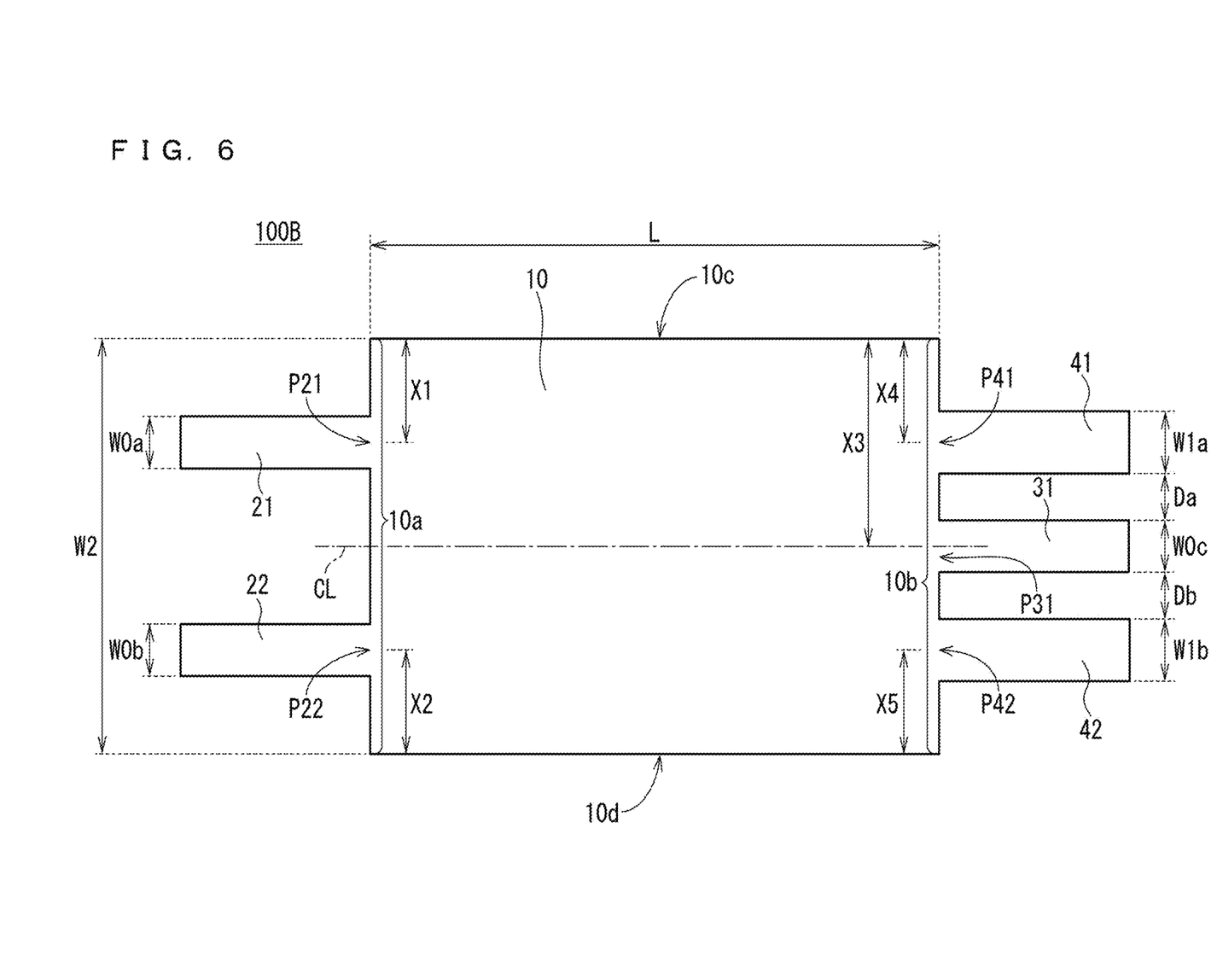
FIG. 6 is a plan view of the configuration of an optical multiplexer in a comparative example.

FIG. 6 is a plan view of the configuration of an optical multiplexer 100B in a comparative example that corresponds to an instance where the angle θ is 0 degrees. The reflectance of the optical multiplexer 100B corresponds to the angle θ=0 degrees in FIG. 4, and is calculated to be −56.65 dB. The optical multiplexer 100B thus has a sufficiently low reflectance. However, the angle θ of 0 degrees leads to difficulty in fine processing through etching for forming the output waveguide 31 and the unwanted-light waveguides 41 and 42. The following describes the details. It is noted that a direction from the incoming end surface 10a toward the outgoing end surface 10b (the rightward direction in FIG. 1) is also referred to as a light propagation direction.

The interval Da between the unwanted-light waveguide 41 and the output waveguide 31 in a position away from the outgoing end surface 10b in the light propagation direction by a distance Z (FIG. 1) is expressed by the following equation:

$$Da=\{W2/4-W1a/(2\cdot\cos\theta a)-W0/2\}+Z\cdot\tan\theta a.$$

Likewise, the interval Db between the unwanted-light waveguide 42 and the output waveguide 31 in a position away from the outgoing end surface 10b in the light propagation direction by the distance Z is expressed by the following equation:

$$Db=\{W2/4-W1b/(2\cdot\cos\theta b)-W0/2\}+Z\cdot\tan\theta b.$$

When the angles θa and θb are smaller than 0 degrees, the intervals Da and Db get smaller as the distance Z increases. In other words, the interval between each of the unwanted-light waveguides 41, 42 and the output waveguide 31 decreases along with distance from the outgoing end surface 10b. This leads to difficulty in fine processing through etching for forming the output waveguide 31 and the unwanted-light waveguides 41 and 42. Further, when the angles θa and θb are 0 degrees, each of the unwanted-light waveguides 41 and 42 and the output waveguide 31 extend in an outgoing direction with the interval Da and Db kept minimum, as illustrated in FIG. 6. This also leads to difficulty in fine processing for forming the output waveguide 31 and the unwanted-light waveguides 41 and 42. Furthermore, the angles θa and θb, even though designed to be 0 degrees, can be actually smaller than 0 degrees due to manufacture error. Accordingly, as illustrated in FIG. 1, the angles θa and θb are preferably greater than 0 degrees.

The configuration of the optical multiplexer 100 in FIG. 1 is one example. Any change may be made to, for instance, the sizes of the multi-mode-interference part, the input waveguides, the output waveguide, and the unwanted-light waveguides, and the positions of the ports.

According to the present embodiment, the unwanted-light waveguides 41 and 42 satisfy the single-mode condition. This reduces the waveguide widths W1a and W1b of the unwanted-light waveguides 41 and 42 when compared to an instance where the unwanted-light waveguides 41 and 42 do not satisfy the single-mode condition. Accordingly, the interval between each of the unwanted-light waveguides 41, 42 and the output waveguide 31 expands. Such an expanded interval facilitates fine processing through etching for forming these waveguides. In one example, an experimental result was obtained that a mask margin improved by 10%. This improvement enables shaping of the waveguides in conformity with design with accuracy, thereby preventing increase in light reflection resulting from processing error. That is, the light reflection reduces. The waveform of light consequently improves.

Each of the unwanted-light waveguides 41 and 42 preferably extends at the angle θ greater than 0 degrees and smaller than 85 degrees with respect to the output waveguide 31. For the angle θ greater than 0 degrees, the interval between each of the unwanted-light waveguides 41, 42 and the output waveguide 31 increases along with distance from the outgoing end surface 10b. In this case, the interval between each of the unwanted-light waveguides 41, 42 and the output waveguide 31, in a location away from the outgoing end surface 10b is greater than the interval between each of the unwanted-light waveguides 41, 42 and the output waveguide 31, on the outgoing end surface 10b. This facilitates fine processing for forming the waveguides not only in a location on the outgoing end surface 10b, but also in a location away from the outgoing end surface 10b, thereby enabling shaping of the waveguides in conformity with design with accuracy. Increase in light reflection resulting from processing error is consequently further prevented. That is, the light reflection reduces. In addition, the angle θ smaller than 85 degrees further reduces the light reflection, as illustrated in FIG. 4.

Second Embodiment

Figure 7:
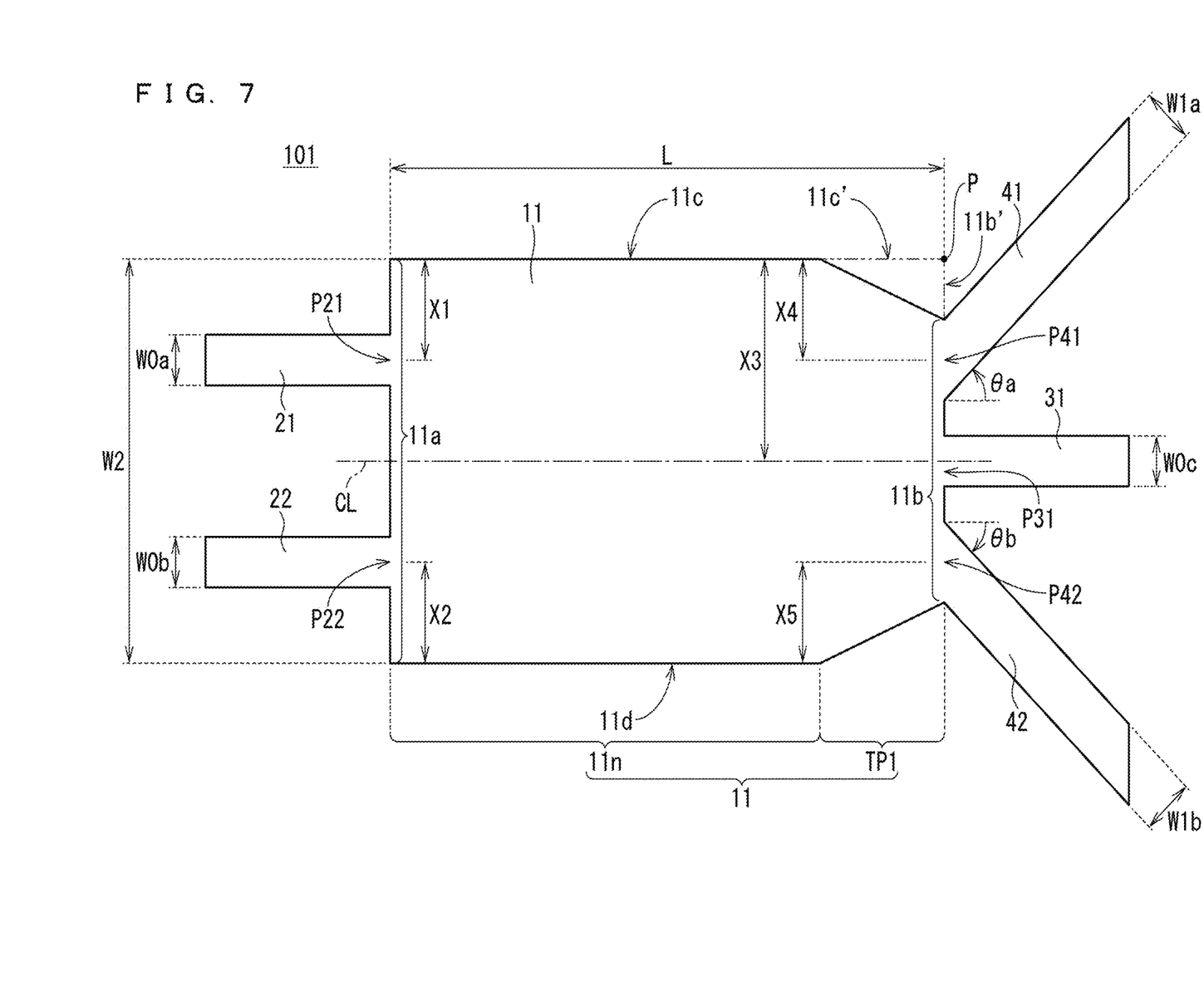
FIG. 7 is a schematic plan view of the configuration of an optical multiplexer according to a second embodiment of the present invention.

FIG. 7 is a schematic plan view of the configuration of an optical multiplexer 101 according to a second embodiment of the present invention. The configuration of the optical multiplexer 101 will be outlined firstly.

The optical multiplexer 101 includes a multi-mode-interference part 11 instead of the multi-mode-interference part 10 (FIG. 1). The multi-mode-interference part 11 is made of a semiconductor material similar to that of the multi-mode-interference part 10 (FIG. 1: the first embodiment). The multi-mode-interference part 11 is provided with an incoming end surface 11a, an outgoing end surface 11b, an end surface 11c, and an end surface 11d, which respectively correspond to the incoming end surface 10a, outgoing end surface 10b, end surface 10c, and end surface 10d of the multi-mode-interference part 10. A straight line passing through the center of the incoming end surface 11a and the center of the outgoing end surface 11b in plan view in FIG. 7 is a center line CL.

The multi-mode-interference part 11 includes a rectangular portion 11n having a substantially rectangular shape, which is similar to the shape of the multi-mode-interference part 10 (FIG. 1), and a tapered portion TP1 having a substantially trapezoidal shape. The tapered portion TP1 specifically has a shape tapering down toward the outgoing end surface 11b. Here, the "shape tapering down toward the outgoing end surface 11b" means a shape such that a width size (the size in the vertical direction in FIG. 7) decreases toward the outgoing end surface 11b (toward the rightward direction in FIG. 7).

The rectangular portion 11n has the incoming end surface 11a connected to the two input waveguides 21 and 22 In other words, the incoming end surface 11a is provided with the input ports P21 and P22. The input ports P21 and P22 are preferably disposed on the incoming end surface 11a so as to be almost symmetrical with respect to the center line CL. The opposite side of the rectangular portion 11n from the incoming end surface 11a is connected to the tapered portion TP1. Both ends of the incoming end surface 11a are connected to the end surfaces 11c and 11d opposite to each other.

The tapered portion TP1 has the outgoing end surface 11b connected to the output waveguide 31 and the two unwanted-light waveguides 41, 42. In other words, the outgoing end surface 11b is provided with the output port P31 and the unwanted-light ports P41, P42. The opposite side of the tapered portion TP1 from the outgoing end surface 11b is connected to the rectangular portion 11n. Both ends of the outgoing end surface 11b are connected to the end surfaces 11c and 11d, which are opposite to each other.

The end surfaces 11c and 11d are substantially parallel with each other in the rectangular portion 11n; moreover, their interval decreases toward the outgoing end surface 11b in the tapered portion TP1. The size of the outgoing end surface 11b (the size in the vertical direction in FIG. 7) is thus smaller than the size of the incoming end surface 11a (the size in the vertical direction in FIG. 7).

Configuration other than that described above, which is almost similar to the configuration described in the first embodiment, will be detailed below.

The multi-mode-interference part 11 has a waveguide width W2 wider than the waveguide width W0a of the input waveguide 21, the waveguide width W0b of the input waveguide 22, and the waveguide width W0c of the output waveguide 31. The waveguide width W2 corresponds to the aforementioned size of the incoming end surface 11a. In the present embodiment, the waveguide width W2 is the waveguide size of the rectangular portion 11n of the multi-mode-interference part 11.

The multi-mode-interference part 11 is formed in such a manner that convergent light can be obtained at one location on the outgoing end surface 11b. The output port P31 is a port for outputting (taking out) this convergent light from the multi-mode-interference part 11. The output port P31 is preferably disposed in the middle of the outgoing end surface 11b. In other words, a distance X3 is about half the waveguide width W2 in FIG. 7. Here, the distance X3 is the distance from the upper end of the incoming end surface 11a in FIG. 7 (i.e., from the end surface 11c) to the center in the width direction of the output port P31 (the vertical direction in FIG. 7).

The input ports P21 and P22 are disposed in such a manner that the convergent light is positioned in the vicinity of the middle of the outgoing end surface 10b. Specifically, the input port P21 is disposed to be away from the upper end of the incoming end surface 11a in FIG. 7 (i.e., from the end surface 11c) by about a quarter of the size of the incoming end surface 11a (the size in the vertical direction in FIG. 7). Moreover, the input port P22 is disposed to be away from the upper end of the incoming end surface 11a in FIG. 7 by about three-quarters of the size of the incoming end surface 11a. In other words, the input port P21 is disposed to be away from the lower end of the incoming end surface 11a in FIG. 7 (i.e., from the end surface 11d) by about three-quarters of the size of the incoming end surface 11a. Moreover, the input port P22 is disposed to be away from the lower end of the incoming end surface 11a in FIG. 7 by about a quarter of the size of the incoming end surface 11a. In other words, distances X1 and X2 are each about a quarter of the waveguide width W2 in FIG. 7. Here, the distance X1 is the distance from the upper end of the incoming end surface 11a in FIG. 7 (i.e., from the end surface 11c) to the center in the width direction of the input port P21 (the vertical direction in FIG. 7). Moreover, the distance X2 is the distance from the upper end of the incoming end surface 11a in FIG. 7 (i.e., from the end surface 11d) to the center in the width direction of the input port P22 (the vertical direction in FIG. 7).

The unwanted-light waveguides 41 and 42 are connected to the outgoing end surface 11b so as to sandwich the output waveguide 31. In other words, the respective unwanted-light waveguides 41 and 42 are connected onto the outgoing end surface 11b on one and the other sides of the output waveguide 31. In other words, the output waveguide 31 is connected to the outgoing end surface 11b, between the unwanted-light waveguides 41 and 42. The unwanted-light ports P41 and P42 are preferably disposed on the incoming end surface 11b so as to be almost symmetrical with respect to the center line CL.

The unwanted-light waveguides 41 and 42 have waveguide widths W1a and W1b narrower than the waveguide width W2 of the multi-mode-interference part 11. The unwanted-light waveguides 41 and 42 each satisfy a single-mode condition. Thus, light entering the unwanted-light waveguides 41 and 42 propagates through the unwanted-light waveguides 41 and 42 not in higher-order mode, but in fundamental mode. The unwanted-light waveguides 41 and 42 preferably, respectively extends at angles θa and θb greater than 0 degrees and smaller than 85 degrees with respect to the output waveguide 31.

For a reason similar to that in the first embodiment, the unwanted-light port P41 is preferably disposed on the outgoing end surface 11b so as to be away from a point P (FIG. 7) by about a quarter of the waveguide width W2; moreover, the unwanted-light port P41 is preferably disposed on the outgoing end surface 11b so as to be away from the point P by about three-quarters of the waveguide width W2. Here the point P is the intersection of an extension line 11c' extended from the end surface 11c of the rectangular portion 11n and an extension line 11b' extended from the outgoing end surface 11b of the rectangular portion 11n. In other words, distances X4 and X5 are each preferably about a quarter of the waveguide width W2 in FIG. 7. Here, the distance X4 is the distance from the end surface 11c of the rectangular portion 11n to the center in the width direction of the unwanted-light port P41 (the vertical direction in FIG. 7). Moreover, the distance X5 is the distance from the end surface 11d of the rectangular portion 11n to the center in the width direction of the unwanted-light port P42 (the vertical direction in FIG. 7).

In the aforementioned arrangement, the width of the outgoing end surface 11b is smaller than the width of the incoming end surface 11a by $\{W2/2-W1a/(2\cdot\cos\theta a)-W1b/(2\cdot\cos\theta b)\}$. The unwanted-light ports P41 and P42 in the present embodiment are thus disposed at both ends of the outgoing end surface 11b.

In the optical multiplexer 101 like the optical multiplexer 100 (FIG. 1), the waveguide width W0a may be, for instance, 1.4 μm; the waveguide width W0b, 1.4 μm; the waveguide width W0c, 1.4 μm; the waveguide width W1a, 2.1 μm; the waveguide width W1b, 2.1 μm; the waveguide width W2, 12.0 μm; the distances X1 and X2, 3.0 μm; the distance X3, 6.0 μm; the distances X4 and X5, 3.0 μm; and a length L, 179 μm. Here, the length L is a size in a direction along the center line CL. Further, the length of the tapered portion TP1, which is included in the length L, can be 20 μm.

The configuration of the optical multiplexer 101 in FIG. 7 is one example. Any change may be made to, for instance, the sizes of the multi-mode-interference part, the input waveguides, the output waveguide, and the unwanted-light waveguides, and the positions of the ports.

According to the present embodiment, the multi-mode-interference part 11 includes the tapered portion TP1 having a shape tapering down toward the outgoing end surface 11b. Accordingly, the outgoing end surface 11b has portions with a small size where the waveguides are not connected. This reduces light reflection on the outgoing end surface 11b.

Third Embodiment

Figure 8:
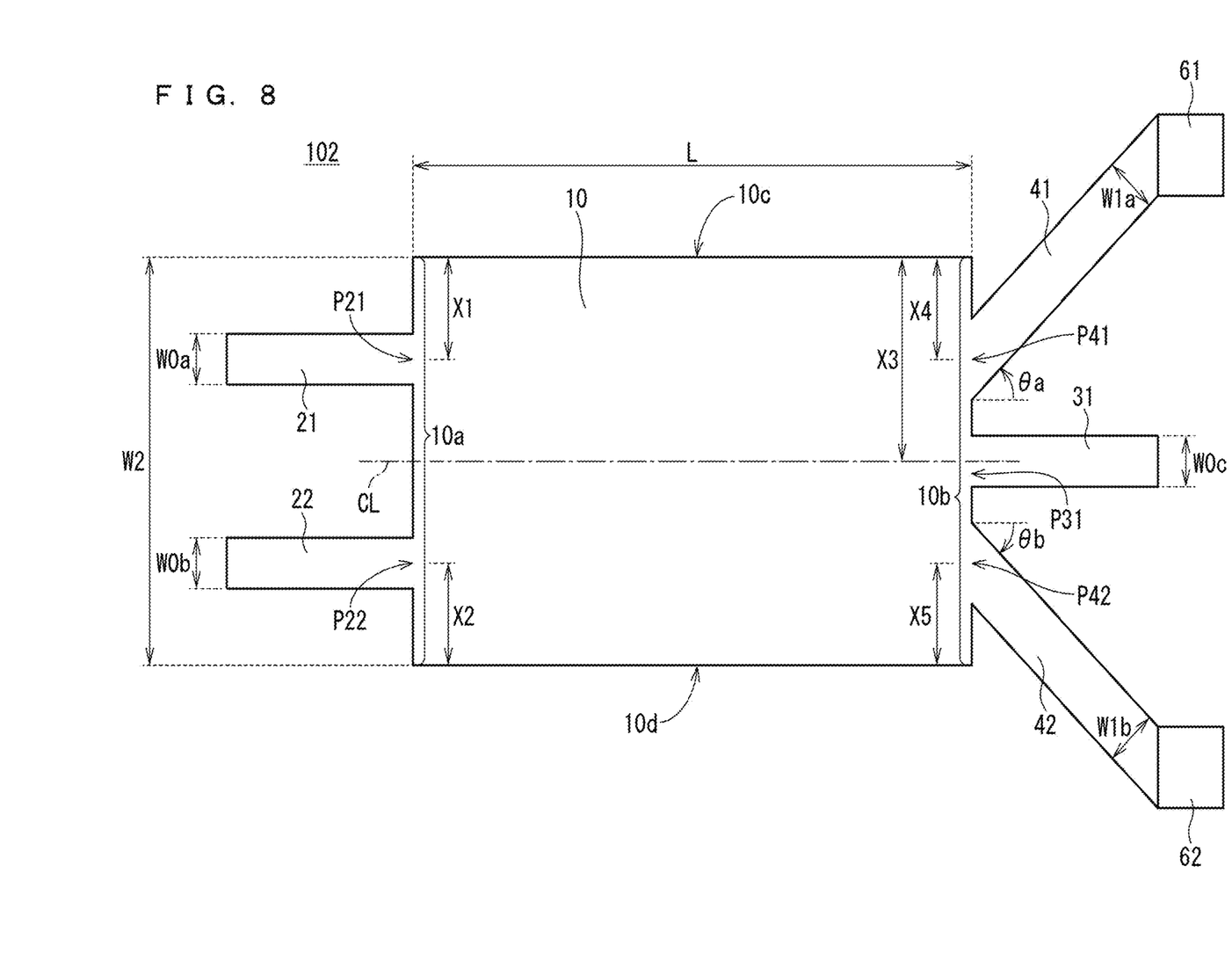
FIG. 8 is a schematic plan view of the configuration of an optical multiplexer according to a third embodiment of the present invention.

FIG. 8 is a schematic plan view of the configuration of an optical multiplexer 102 according to a third embodiment of the present invention. The unwanted-light waveguides 41 and 42 each have one end (the left end in the drawing) connected to the outgoing end surface 10b of the multi-mode-interference part 10, and the other end (the right end in the drawing) opposite the one end. The optical multiplexer 102 has absorption layers 61 and 62 that are connected to the respective other ends of the unwanted-light waveguide 41 and 42, and absorb respective light beams from the unwanted-light waveguides 41 and 42. In manufacturing an apparatus that includes the optical multiplexer 102 integrated with a laser, the absorption layers 61 and 62 can be formed by, for instance, leaving an active layer of the laser.

It is noted that configuration other than that described above is almost the same as the configuration of the optical multiplexer 100 (FIG. 1: the first embodiment); thus identical or corresponding components are denoted by the same signs and will not be elaborated upon. It is also noted that the absorption layers 61 and 62 may be used in the optical multiplexer 101 (FIG. 7: the second embodiment).

According to the present embodiment, the absorption layers 61 and 62 are disposed at the other ends of the unwanted-light waveguide 41 and 42. This prevents light entering the unwanted-light waveguides 41 and 42 from returning to the other-mode interferometer due to reflection at the other ends.

Fourth Embodiment

Figure 9:
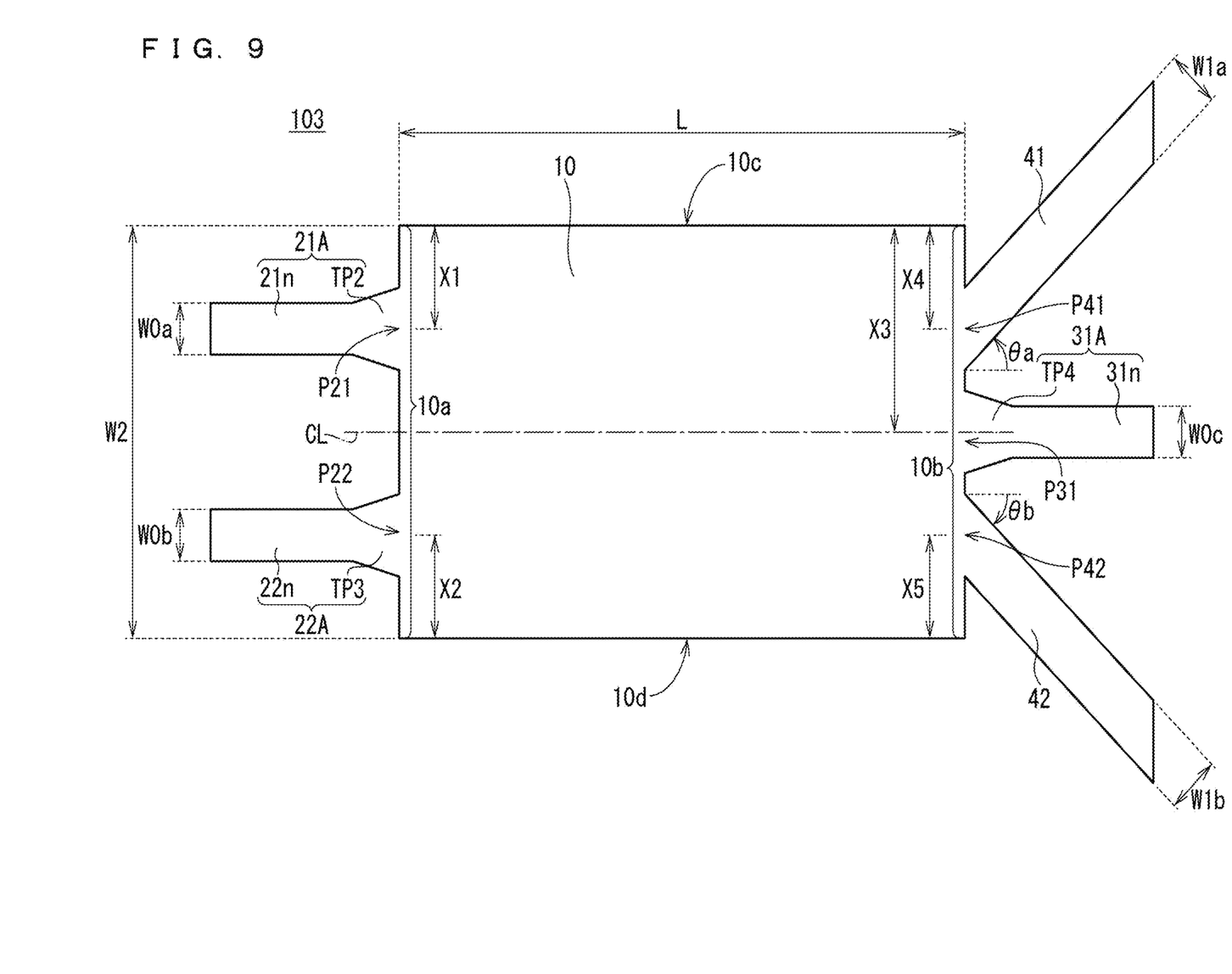
FIG. 9 is a schematic plan view of the configuration of an optical multiplexer according to a fourth embodiment of the present invention.

FIG. 9 is a schematic plan view of the configuration of an optical multiplexer 103 according to a fourth embodiment of the present invention. The optical multiplexer 103 has input waveguides 21A and 22A instead of the input waveguides 21 and 22. The optical multiplexer 103 also has an output waveguide 31A instead of the output waveguide 31. The input waveguides 21A and 22A are made of a semiconductor material similar to that of the input waveguides 21 and 22 (FIG. 1: the first embodiment). The output waveguide 31A is made of a semiconductor material similar to that of the output waveguide 31 (FIG. 1: the first embodiment).

The input waveguide 21A has a waveguide portion 21n and a tapered portion TP2. The tapered portion TP2 has a shape tapering down from the incoming end surface 10a. Here, the "shape tapering down from the incoming end surface 10a" is a shape such that a width size (the size in the vertical direction in FIG. 9) decreases along with distance from the incoming end surface 10a. The tapered portion TP2 extends from the input port P21 of the incoming end surface 10a, and is connected to the waveguide portion 21n. The waveguide portion 21n is thus connected to an end whose width is smallest in the tapered portion TP2. The waveguide portion 21n has a uniform width W0a.

Likewise, the input waveguide 22A has a waveguide portion 22n and a tapered portion TP3. The tapered portion TP3 has a shape tapering down from the incoming end surface 10a. The tapered portion TP3 extends from the input port P22 of the incoming end surface 10a, and is connected to the waveguide portion 22n. The waveguide portion 22n is thus connected to an end whose width is smallest in the tapered portion TP3. The waveguide portion 22n has a uniform width W0b.

The output waveguide 31A has a waveguide portion 31n and a tapered portion TP4. The tapered portion TP4 has a shape tapering down from the outgoing end surface 10b. Here, the "shape tapering down from the outgoing end surface 10b" is a shape such that a width size (the size in the vertical direction in FIG. 9) decreases along with distance from the outgoing end surface 10b. The tapered portion TP4 extends from the output port P31 of the outgoing end surface 10b, and is connected to the waveguide portion 31n. The waveguide portion 31n is thus connected to an end whose width is smallest in the tapered portion TP4. The waveguide portion 31n has a uniform width W0c.

The following describes an example of the detailed configurations of the input waveguides 21A and 22A. The waveguide widths W0a and W0b of the waveguide portions 21n and 22n are 1.4 μmm for instance. Further, the tapered portions TP2 and TP3 are each 20 μm long in a light propagation direction. The tapered portions TP2 and TP3 are trapezoidal. The tapered portions TP2 and TP3 are each 3.0 μm wide in the incoming end surface 10a. The widths of the tapered portions TP2 and TP3 decrease from 3.0 μm to a minimum of 1.4 μm along with distance from the respective input ports P21 and P22. It is noted that the shapes of the tapered portions TP2 and TP3 are not limited to a trapezoid having straight, oblique lines. For instance, the oblique lines may be not straight, but curved. In this case, respective portions whose widths are smallest in the tapered portions TP2 and TP3 can be gently connected to the waveguide portions 21n and 22n by the curved lines.

The following describes an example of the detailed configuration of the output waveguide 31A. For instance, the waveguide width W0c of the waveguide portion 31n is 1.4 μm. Further, the tapered portion TP4 is 20 μm long in a light propagation direction. The tapered portion TP4 is trapezoidal. The tapered portion TP4 is 3.0 μm wide in the outgoing end surface 10b. The width of the tapered portion TP4 decreases from 3.0 μm to a minimum of 1.4 μm along with distance from the output port P31. It is noted that the shape of the tapered portion TP4 is not limited to a trapezoid having straight, oblique lines. For instance, the oblique lines may be not straight, but curved. In this case, a portion whose width is smallest in the tapered portion TP4 can be gently connected to the waveguide portion 31n by the curved lines.

The configuration of the optical multiplexer 103 in FIG. 9 is one example. Any change may be made to, for instance, the sizes of the multi-mode-interference part, the input waveguides, the output waveguide, and the unwanted-light waveguides, and the positions of the ports. Further, configuration other than that described above is almost the same as the configuration of the optical multiplexer 100 (FIG. 1: the first embodiment); thus identical or corresponding components are denoted by the same signs and will not be elaborated upon. Still further, the input waveguides 21A and 22A and the output waveguide 31A may be used in the optical multiplexer 101 (FIG. 7: the second embodiment) or the optical multiplexer 102 (FIG. 8: the third embodiment).

According to the present embodiment, even if the shape of the optical multiplexer 103 is depart from design in some degree due to processing error, loss and reflection do not greatly increase.

Fifth Embodiment

Figure 10:
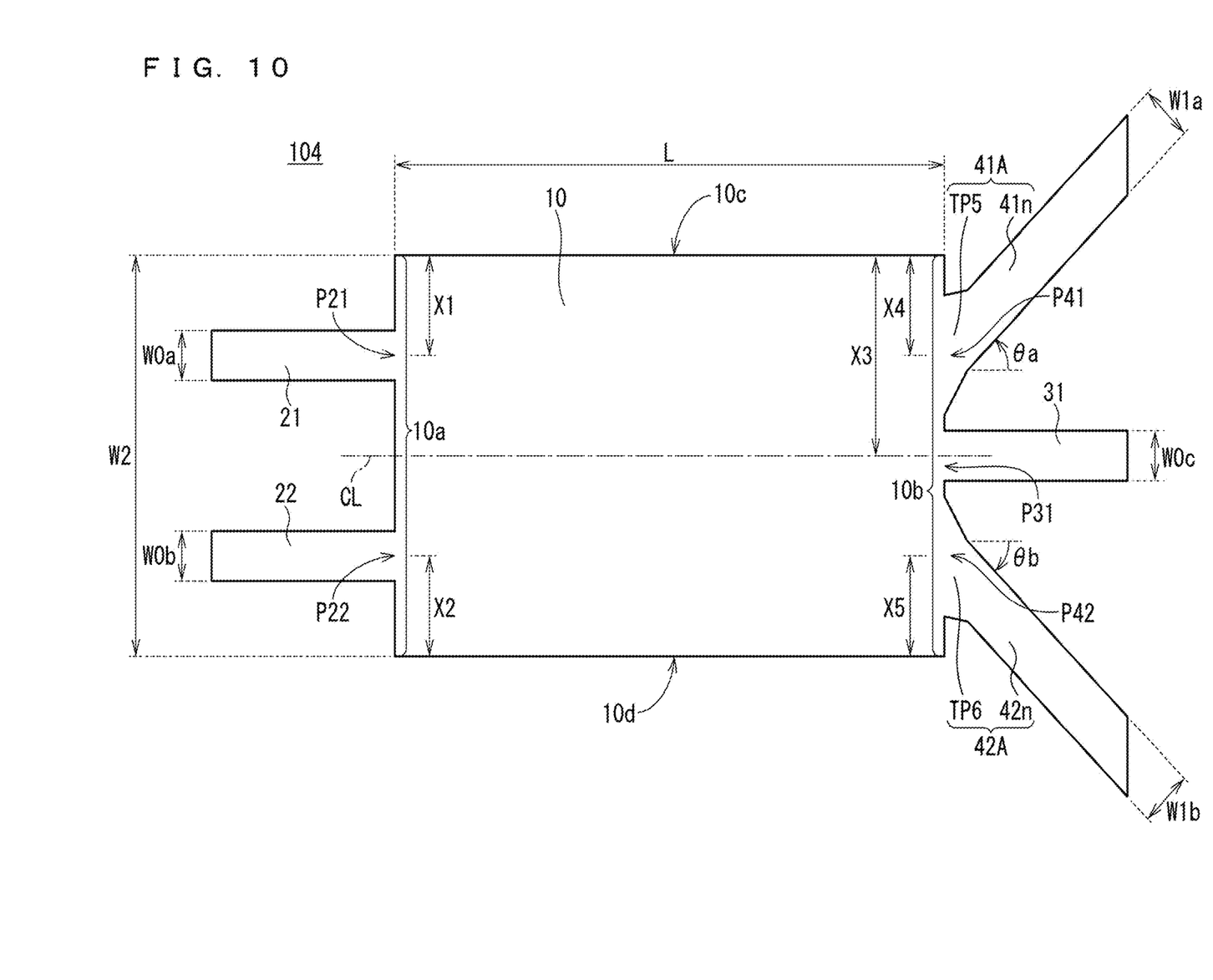
FIG. 10 is a schematic plan view of the configuration of an optical multiplexer according to a fifth embodiment of the present invention.

FIG. 10 is a schematic plan view of the configuration of an optical multiplexer 104 according to a fifth embodiment of the present invention. The optical multiplexer 104 has unwanted-light waveguides 41A and 42A instead of the unwanted-light waveguides 41 and 42. The unwanted-light waveguides 41A and 42A are made of a semiconductor material similar to that of the unwanted-light waveguides 41 and 42 (FIG. 1: the first embodiment).

The unwanted-light waveguide 41A has a waveguide portion 41n and a tapered portion TP5. The tapered portion TP5 has a shape tapering down from the outgoing end surface 10b. Here, the "shape tapering down from the outgoing end surface 10b" is a shape such that a width size (the size in the vertical direction in FIG. 10) decreases along with distance from the outgoing end surface 10b. The tapered portion TP5 extends from the unwanted-light port P41 of the outgoing end surface 10b, and is connected to the waveguide portion 41n. The waveguide portion 41n is thus connected to an end whose width is smallest in the tapered portion TP5. The waveguide portion 41n has a uniform width W1a.

Likewise, the unwanted-light waveguide 42A has a waveguide portion 42n and a tapered portion TP6. The tapered portion TP6 has a shape tapering down from the outgoing end surface 10b. The tapered portion TP6 extends from the unwanted-light port P42 of the outgoing end surface 10b, and is connected to the waveguide portion 42n. The waveguide portion 42n is thus connected to an end whose width is smallest in the tapered portion TP6. The waveguide portion 42n has a uniform width W1b.

The following describes an example of the detailed configurations of the input waveguides 41A and 42A. The waveguide widths W1a and W1b of the waveguide portions 41n and 42n are 2.1 μm for instance. Further, the tapered portions TP5 and TP6 are each 20 μm long in a light propagation direction. The tapered portions TP5 and TP6 are trapezoidal. The tapered portions TP5 and TP6 are each 3.0 μm wide in the outgoing end surface 10b. The widths of the tapered portions TP5 and TP6 decrease from 3.0 μm to a minimum of 2.1 μm along with distance from the respective unwanted-light ports P41 and P42. It is noted that the shapes of the tapered portions TP5 and TP6 are not limited to a trapezoid having straight, oblique lines. For instance, the oblique lines may be not straight, but curved. In this case, respective portions whose widths are smallest in the tapered portions TP5 and TP6 can be gently connected to the waveguide portions 41n and 42n by the curved lines.

The configuration of the optical multiplexer 104 in FIG. 10 is one example. Any change may be made to, for instance, the sizes of the multi-mode-interference part, the input waveguides, the output waveguide, and the unwanted-light waveguides, and the positions of the ports. Further, configuration other than that described above is almost the same as the configuration of the optical multiplexer 100 (FIG. 1: the first embodiment); thus identical or corresponding components are denoted by the same signs and will not be elaborated upon. Still further, the unwanted-light waveguides 41A and 42A may be used in the optical multiplexer 101 (FIG. 7: the second embodiment), the optical multiplexer 102 (FIG. 8: the third embodiment), or the optical multiplexer 103 (FIG. 9: the fourth embodiment).

According to the present embodiment, unwanted light beams from the multi-mode-interference part 10 efficiently join to the unwanted-light waveguide 41 and 42.

Sixth Embodiment

Figure 11:
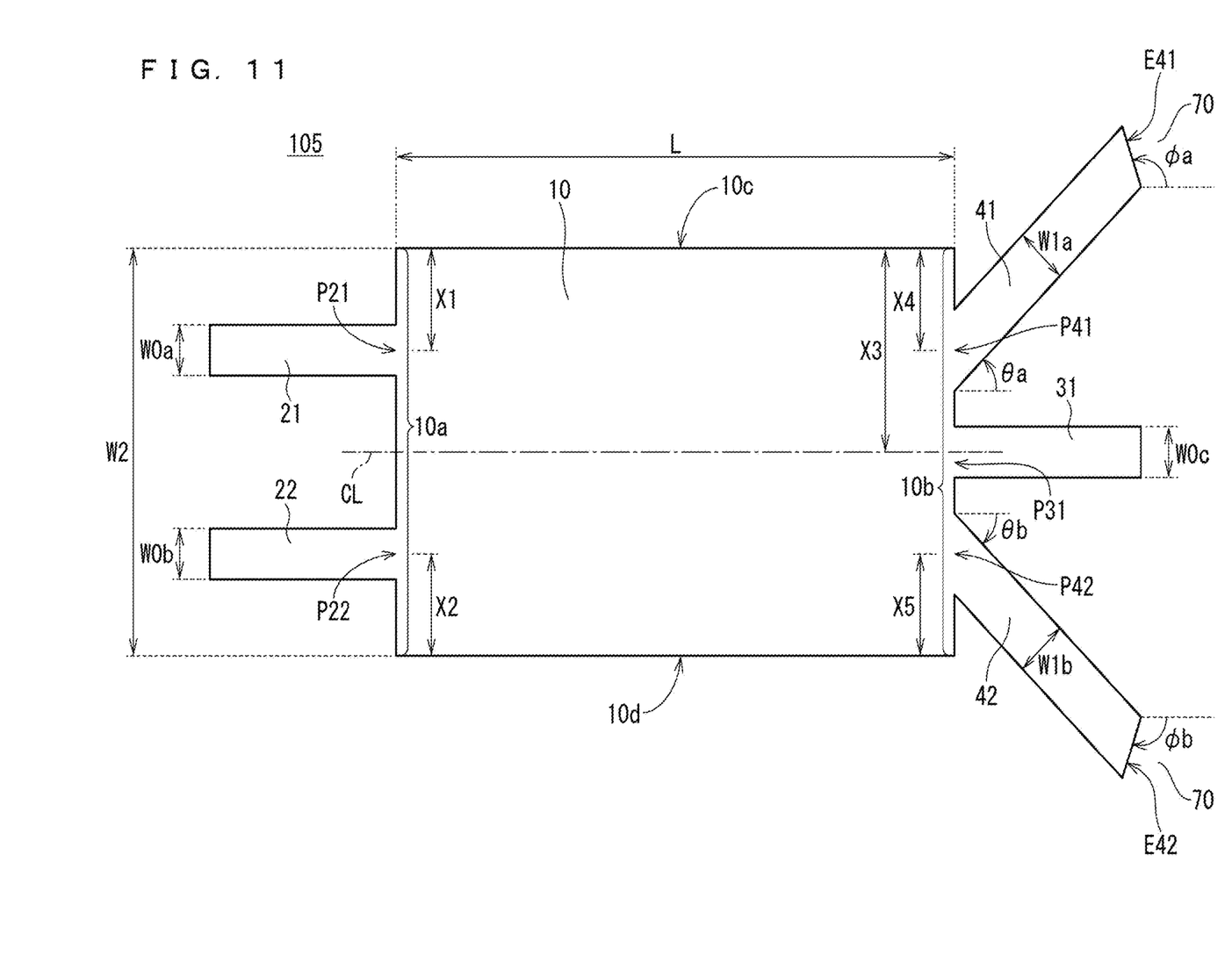
FIG. 11 is a schematic plan view of the configuration of an optical multiplexer according to a sixth embodiment of the present invention.

FIG. 11 is a schematic plan view of the configuration of an optical multiplexer 105 according to a sixth embodiment of the present invention. The unwanted-light waveguide 41 has one end (the left end in the drawing) connected to the outgoing end surface 10b of the multi-mode-interference part 10, and the other end (the right end in the drawing) opposite the one end. The other end includes a terminal surface that is flat. Likewise, the unwanted-light waveguide 42 has one end (the left end in the drawing) connected to the outgoing end surface 10b of the multi-mode-interference part 10, and the other end (the right end in the drawing) opposite the one end. The other end includes a terminal surface E42 that is flat. The terminal surfaces E41 and E42 respectively form angles φa and φb with respect to the output waveguide 31. The terminal surfaces E41 and E42 face medium 70; and light beams are emitted from the terminal surfaces E41 and E42 to the medium 70. The angles φa and φb satisfy the following expressions in radians, where $\lambda_0$ denotes the wavelength of light in a vacuum, where n denotes the refractive index of each medium 70:

$$\varphi a > \lambda_0(\pi \cdot W1a \cdot n) + \pi/2; \text{ and}$$

$$\varphi b > \lambda_0(\pi \cdot W1b \cdot n) + \pi/2.$$

It is noted that configuration other than that described above is almost the same as the configuration of the optical multiplexer 100 (FIG. 1: the first embodiment); thus identical or corresponding components are denoted by the same signs and will not be elaborated upon. It is also noted that the terminal surfaces E41 and E42 may be used in the optical multiplexer 101 (FIG. 7: the second embodiment), the optical multiplexer 102 (FIG. 8: the third embodiment), the optical multiplexer 103 (FIG. 9: the fourth embodiment), or the optical multiplexer 104 (FIG. 10: the fifth embodiment).

According to the present embodiment, light beams emitted from the other ends of the unwanted-light waveguides 41 and 42 do not join to a light beam propagating through the output waveguide 31. This prevents deformation of a beam emitted from the outgoing end surface 10b.

It is noted that in the present invention, the individual embodiments can be freely combined, or can be modified and omitted as appropriate, within the scope of the invention. While the invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

P21, P22 input port, P31 output port, P41, P42 unwanted-light port, CL center line, TP1 to TP6 tapered portion, 10, 11 multi-mode-interference part, 10a, 11a incoming end surface, 10b, 11b outgoing end surface, 10c, 10d, 11c, 11d end surface, 11n rectangular portion, 21, 21A, 22, 22A input waveguide, 21n, 22n, 31n, 41n, 42n waveguide portion, 31 31A output waveguide, 41, 41A, 42, 42A unwanted-light waveguide, 50 substrate, 51 core layer, 52, 53 cladding layer, 61, 62 absorption layer, 100 to 104 optical multiplexer.

The invention claimed is:
1. An optical multiplexer comprising:
first and second input waveguides made of a semiconductor material;
one output waveguide made of a semiconductor material;
a multi-mode-interference part made of a semiconductor material, the multi-mode-interference part comprising an incoming end surface comprising first and second input ports respectively connected to the first and second input waveguides, and an outgoing end surface opposite to the incoming end surface and comprising an output port connected to the output waveguide, the multi-mode-interference part having a waveguide width wider than waveguide widths of the first and second input waveguides and a waveguide width of the output waveguide; and first and second unwanted-light waveguides made of a semiconductor material, and respectively connected to first and second unwanted-light ports disposed on the outgoing end surface of the multi-mode-interference part so as to sandwich the output waveguide, a distance from a first end of the incoming end surface to a center of the first input port, a distance from a second end of the incoming end surface to a center of the second input port, a distance from a first end of the outgoing end surface to a center of the first unwanted-light port, and a distance from a second end of the outgoing end surface to a center of the second unwanted-light port being equal, the first and second unwanted-light waveguides each satisfying a single-mode condition, and the first and second unwanted-light waveguides each extending at an angle greater than 0 degree and smaller than 85 degrees with respect to the output waveguide.

2. The optical multiplexer according to claim 1, wherein the first and second unwanted-light waveguides each comprise one end connected to the outgoing end surface of the multi-mode-interference part, and another end opposite the one end, and the optical multiplexer further comprises an absorption layer connected to the other end of each of the first and second unwanted-light waveguides and configured to absorb a light beam from each of the first and second unwanted-light waveguides.

3. The optical multiplexer according to claim 1, wherein the output waveguide comprises a tapered portion having a shape tapering down from the outgoing end surface.

4. The optical multiplexer according to claim 1, wherein the first and second input waveguides each comprise a tapered portion having a shape tapering down from the incoming end surface.

5. The optical multiplexer according to claim 1, wherein the first and second unwanted-light waveguides each comprise a tapered portion having a shape tapering down from the outgoing end surface.

6. The optical multiplexer according to claim 1, wherein the first unwanted-light waveguide has a waveguide width of $W1a$, and the second unwanted-light waveguide has a waveguide width of $W1b$, the first unwanted-light waveguide and the second unwanted-light waveguide respectively comprise a first terminal surface and a second terminal surface that face a medium having a refractive index of n, the first terminal surface and the second terminal surface respectively form an angle of $\varphi a$ and an angle of $\varphi b$ with respect to the output waveguide, and the following expressions are satisfied, where $\lambda_0$ denotes a wavelength of light in a vacuum:

$$\varphi a > \lambda_0/(\pi \cdot W1a \cdot n) + \pi/2; \text{ and}$$

$$\varphi b > \lambda_0/(\pi \cdot W1b \cdot n) + \pi/2.$$

7. The optical multiplexer according to claim 1, wherein the multi-mode-interference part has a rectangular shape.

8. The optical multiplexer according to claim 1, wherein the multi-mode-interference part comprises a rectangular portion comprising the incident end surface, and a tapered portion comprising the outgoing end surface, the tapered portion has a shape tapering down toward the outgoing end surface, the rectangular portion comprises first and second end surfaces connected to both ends of the incoming end surface and facing each other, a first point is defined as an intersection between an extension line extended from the first end surface and an extension line extended from the outgoing end surface, a second point is defined as an intersection between an extension line extended from the second end surface and an extension line extended from the outgoing end surface, and a distance from the first point to the center of the first unwanted-light port and a distance from the second point to the center of the second unwanted-light port are equal.

9. The optical multiplexer according to claim 1, wherein the angle is an angle at which etching can be performed when the optical multiplexer is produced.

* * * * *